(12) United States Patent  (10) Patent No.: US 8,086,728 B2
Nasnas  (45) Date of Patent: Dec. 27, 2011

(54) METHOD AND APPARATUS OF CORRELATING POWER USAGE WITH TRAFFIC FLOW FOR A NETWORK DEVICE

(75) Inventor: Ramzi K Nasnas, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 184 days.

(21) Appl. No.: 12/403,209

(22) Filed: Mar. 12, 2009

(65) Prior Publication Data

US 2010/0235490 A1  Sep. 16, 2010

(51) Int. Cl.
*G06F 15/173* (2006.01)
(52) U.S. Cl. .................................... 709/224; 709/223
(58) Field of Classification Search .......... 709/223–224, 709/232, 234, 238
See application file for complete search history.

(56) References Cited

U.S. PATENT DOCUMENTS

| | | | |
|---|---|---|---|
| 2006/0282685 A1* | 12/2006 | Bahali et al. | 713/300 |
| 2008/0040621 A1* | 2/2008 | Smith | 713/300 |
| 2008/0043656 A1* | 2/2008 | Yoon et al. | 370/311 |
| 2009/0052372 A1* | 2/2009 | Durazzo et al. | 370/318 |
| 2009/0198385 A1* | 8/2009 | Oe et al. | 713/320 |
| 2010/0128645 A1* | 5/2010 | Lin et al. | 370/311 |

* cited by examiner

*Primary Examiner* — Philip B Tran

(57) ABSTRACT

A network device including: a power utilization monitor for monitoring and determining the power usage for the network device, the power usage being associated with a predetermined time value when the power usage was monitored; a data traffic monitor for determining the traffic flow of the network device, the traffic flow being associated with a predetermined time value when the traffic flow was measured; and a data correlator for correlating the power usage of the network device to the data traffic of the network device by associating the predetermined time value when the power usage was monitored with the predetermined time value when the data traffic flow measurement was made is described.

18 Claims, 4 Drawing Sheets

METHOD AND APPARATUS OF CORRELATING POWER USAGE WITH TRAFFIC FLOW FOR A NETWORK DEVICE

BACKGROUND

How a device operates in a network and specifically how the device controls the traffic flow within the network is a concern of the system administrator and network designer. A method and apparatus that monitors and considers other network device performance criteria would facilitate improved decision making and facilitate network design.

BRIEF DESCRIPTION OF THE DRAWINGS

The figures depict implementations/embodiments of the invention and not the invention itself. Some embodiments of the invention are described, by way of example, with respect to the following figures.

DETAILED DESCRIPTION

Figure 1:
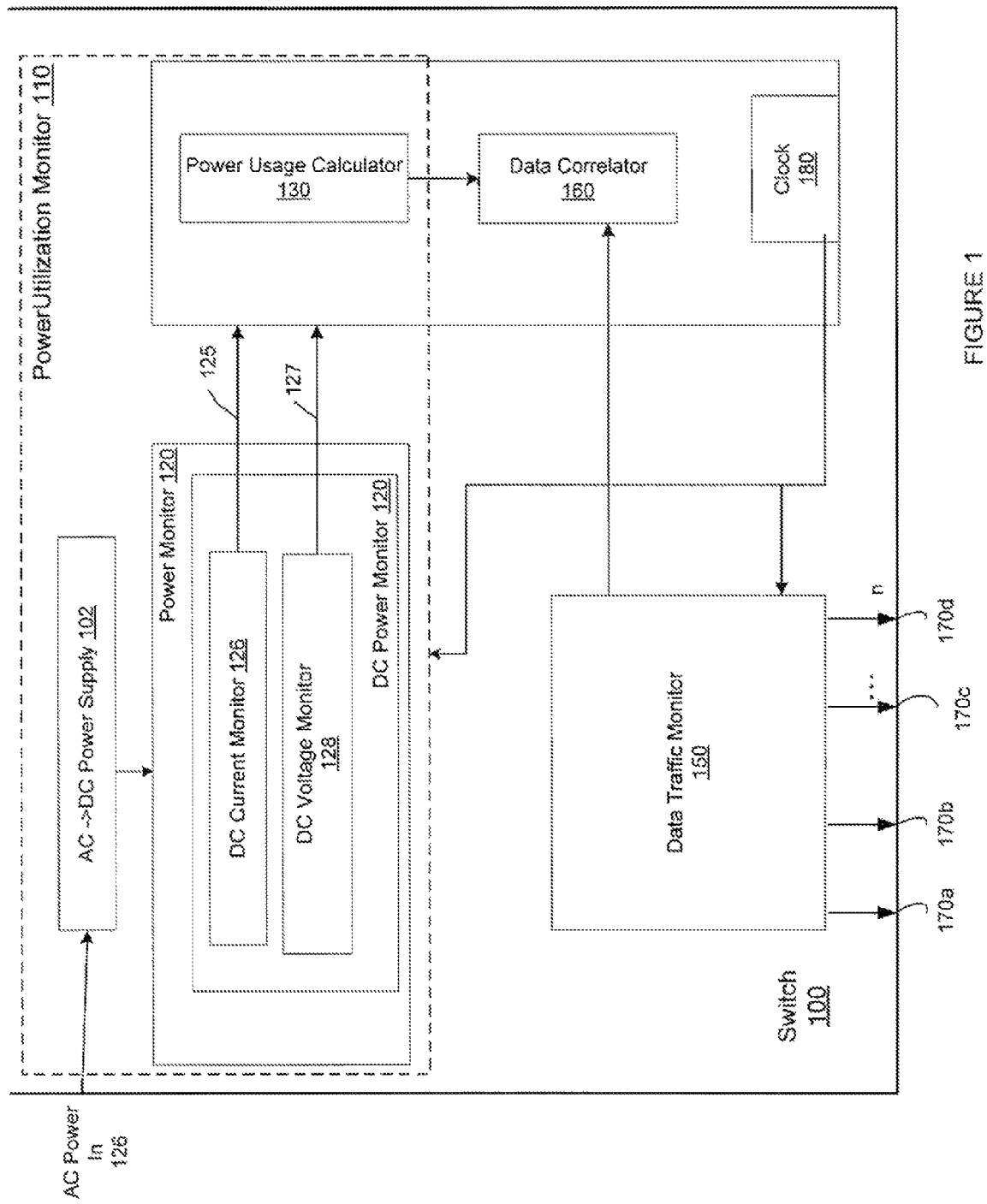
FIG. 1 is a block diagram conceptually illustrating a network switch in accordance with one embodiment of the invention.
Figure 2:
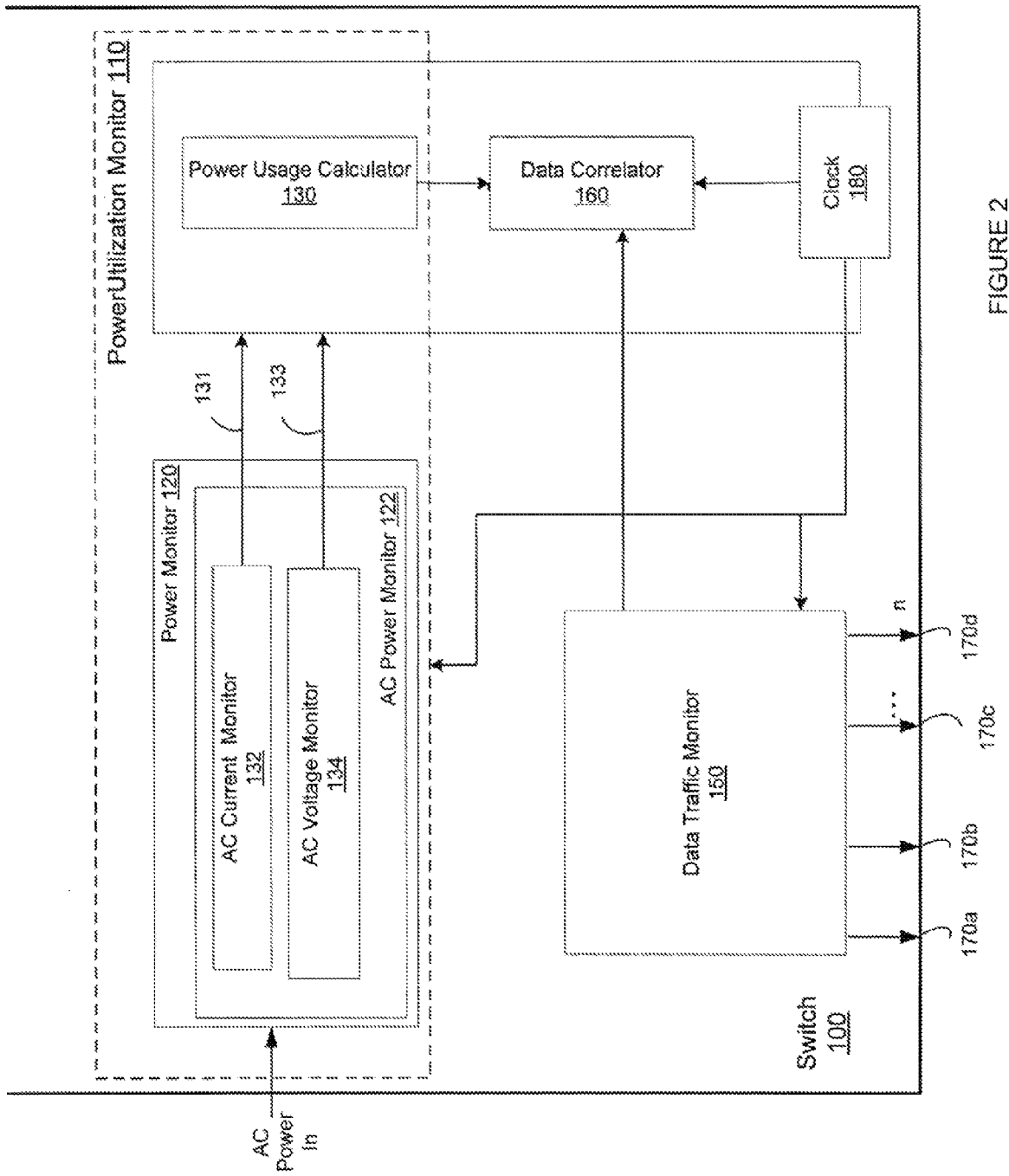
FIG. 2 is a block diagram conceptually illustrating a network switch in accordance with an alternative embodiment of the invention.

The described invention describes a method and apparatus for correlating power usage to data traffic flow in a network switch. The resulting data can be used by a network designer or system administrator to facilitate more intelligent decision making regarding network and traffic flow design. Referring to FIGS. 1 and 2 show a block diagram of a network device 100 according to alternative embodiments of the invention. The network device 100 includes: a power utilization monitor 110 for monitoring and determining the power usage for the network device, the power usage being associated with a predetermined time value when the power usage was monitored: a data traffic monitor 150 for determining the traffic flow of the network device, the traffic flow being associated with a predetermined time value when the traffic now was measured; and a data correlator 160 for correlating the power usage of the network device to the data traffic of the network device by associating the predetermined time value when the power usage was monitored with the predetermined time value when the data traffic flow measurement was made.

Determining the actual power usage of a network switch over time as correlated to the actual data traffic over a network switch could be particularly useful as the data traffic over a network switch tends to be bursty in nature. The described embodiment calculates the actual numbers for the power usage/data traffic flow (watts/Gigabit) and reports them in real time. The reported power usage/data traffic flow can be used by the network system designer to determine the power usage efficiency of the networked switch. This data will be helpful in the development and design of future patterns of usage on the network and in helping the network designer to determine the best network configuration to optimize network with respect to it's power efficiency. It can be utilized to determine the efficiency of shutting down certain functions or portions of the switching fabric within the switch.

Referring to FIGS. 1 and 2 show a network switch 100. Although the descriptions are primarily made with reference to a network switch, it is anticipated that the described method and apparatus are applicable to any network device, where a network device may be described as any device found within a network which controls the flow of data in a network. It is anticipated that term network device would apply to for example, a network switch device or to a network router device.

Compared to a conventional switch, the network switch 100 shown in FIGS. 1 and 2 includes additional hardware and software to measure and calculate the power usage of the switch, monitor of the data traffic of the network switch, and calculate the power usage efficiency within the network switch. The network switch 100 includes a power utilization monitor 110 which typically includes a combination of both hardware monitoring devices and software which takes the monitored power data and calculates the power used within the network switch. In most of the described embodiments, the power used by the switch is estimated to be the power input into the switch less any power outsourced by the switch to other devices as Power Over Ethernet (POE) over the data cable, if the switch is a power sourcing POE switch.

Referring to FIGS. 1 and 2 shows a power utilization monitor 110 that includes a power monitor 120 and a power usage calculator 130. In the embodiment shown in FIG. 1, the power monitor 120 includes a DC power monitor 124. The DC power monitor 124 includes a DC current monitor 126 capable of monitoring and measuring the DC current value used in the switch and a DC voltage monitor 128 capable of monitoring and measuring the DC voltage in the switch 100. The DC power monitor 124 is electrically coupled to an AC to DC conversion power supply 102 and a power usage calculator 130. Further, the AC input power line 126 is electrically coupled to an AC to DC conversion power supply 102. The AC to DC conversion power supply 102 takes the AC power supplied by the AC power line 126 and converts it to a DC power source.

In a second alternative embodiment shown in FIG. 2, the power monitor 120 includes an AC power monitor 124. The AC power monitor 122 includes an AC current monitor 132 capable of monitoring and measuring the AC current value used in the switch and an AC voltage monitor 134 capable of monitoring and measuring the AC voltage in the switch 100. The AC power monitor 122 is electrically coupled to the AC input power line 126 and a power usage calculator 130.

Although the circuit implementation shown in FIG. 1, is typically less expensive to implement, the power calculation is more cumbersome. For the DC implementation shown in FIG. 1, an additional step which takes into account the inefficiency of the AC to DC conversion that is done in the AC to DC conversion power supply 102. In one embodiment, the efficiency curve for the AC to DC conversion power supply may be supplied by the manufacturer of the power supply. Alternatively, an efficiency curve may be determined by user experimentation. The efficiency curve data may be stored in a lookup table that is stored in memory accessible by the CPU. Given the efficiency curve for the AC to DC conversion power supply 102, the total AC power entering into the switch 100 can be determined.

Figure 3:
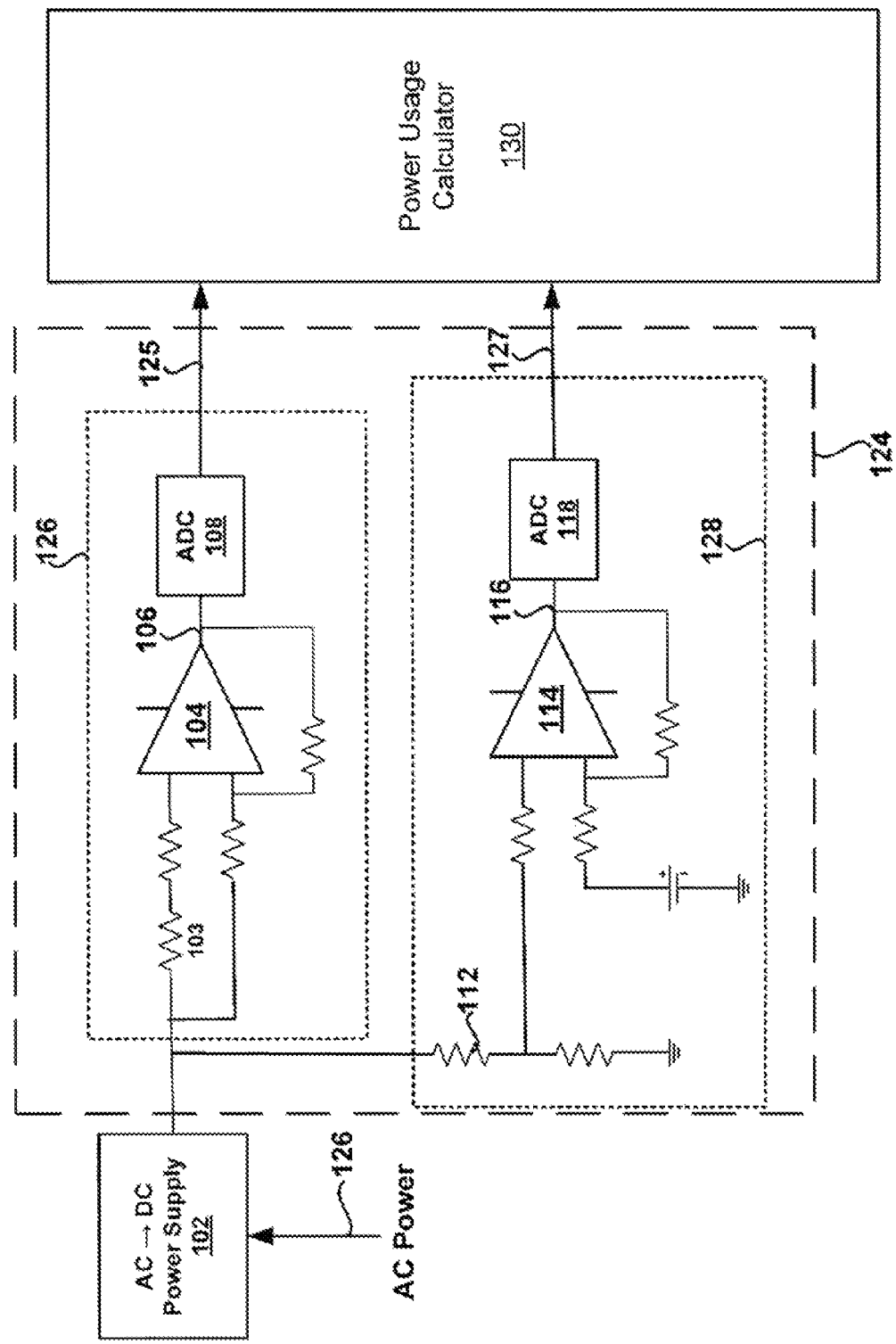
FIG. 3 is a block diagram conceptually illustrating the power sensing circuitry of the network switch in accordance with an embodiment of the invention.

FIG. 3 shows a block diagram conceptually illustrating further detail of the DC power monitor 124 shown in FIG. 1. FIG. 3 shows one possible circuit implementation of a DC current and DC voltage monitor. Circuits for measuring DC current and voltage are available and numerous circuit configurations are possible. For purposes of example, a DC current monitoring device 126 is shown as a precision series resistor 103 electrically coupled to an operational amplifier 104. The output of this circuit is an analog value 106. An analog to digital converter (ADC) 108 is used to convert the analog value (106) of the measured current into a digital value.

For purposes of example, a DC voltage monitoring circuit 128 is shown as a precision resistor 112 in parallel that is electrically coupled to an operational amplifier 114. The output of this circuit is an analog value 116. An analog to digital converter (ADC) 118 is used to convert the analog value 116 into a digital value 127 that may be easily used by the power usage calculator 130.

The digital output 125 from the DC current monitor 126 and the digital output 127 of the DC voltage monitor 128 are both electrically coupled to the power usage calculator 130. The digital values of the DC current 125 and DC voltage 127 are multiplied together by the power usage calculator 130 to generate the total DC power input into the network switch 100.

In one alternative embodiment, the DC Power monitor 124 does not include a DC voltage monitor 128 to monitor the instantaneous voltage measurement. This embodiment provides an estimated value instead of an actual monitored value. This estimated value may be acceptable since DC voltages for power supplies are typically rated and have minimal variations (plus or minus 5%) from their rated value. In this case, the value of the DC voltage might be a data value that is stored in memory that is accessible by the power usage calculator software for computing a DC power value. In this case, the term measured or monitored DC voltage value refers to a voltage value stored in memory instead or the output 116 from DC voltage monitoring device. In this case, the DC voltage is invariable and the power usage calculator 130 retrieves the DC voltage data value stored in memory for the value to be used in the power usage computation.

Referring to FIG. 2, the AC power monitor 122 is electrically coupled to the AC input power 126 and the power usage calculator 130. Similar to the DC power monitoring circuitry 124 shown in FIG. 3 (although a detailed circuit implementation is not shown) circuits for measuring AC current and voltage from an AC circuit are available and numerous implementations are possible.

In one embodiment, the power usage calculator 130 is implemented in software that is loaded onto the CPU 140 of the network switch 100. Monitored data measurements ((125, 127 for the embodiment shown in FIG. 1) and (131, 133 for the embodiment shown in FIG. 2)) from the power monitor 120 are read by the power usage calculator 130. The power usage calculator 130 is software located on the CPU 140 that computes the total power input into the network switch 100. In the embodiment shown in FIG. 1, the power usage may be estimated to be the total DC power where the DC power may be calculated by multiplying the DC monitored current 125 and the DC monitored voltage 127. In the embodiment shown in FIG. 2, the AC power may be calculated by multiplying the AC monitored current 131 and the AC monitored voltage 133.

In an alternative embodiment, instead of using an instantaneous power usage value as the power usage value, the average power usage can be used. For this embodiment, the instantaneous power at time T1 is added to the instantaneous power value at time T2. The total of these values is then divided by two to provide and average power value during the time period T2−T1

Referring to FIGS. 1 and 2 shows a clock 180 electrically coupled to the power utilization monitor 110, the data traffic monitor 150 and the data correlator 160. The clock provides a predetermined time value that can be associated with the power usage value. For example, for the DC power a predetermined time value T1 might be associated with a DC current measurement 106 and a DC voltage measurement 116. The power usage for a time T1 for the DC implementation shown in FIG. 1 would then be the DC current monitored at a predetermined time value T1 multiplied by the DC voltage monitored at a predetermined time value T1.

Instructions of software described above (including the software for implementing the power usage calculator function shown in FIG. 3 and the software for implementing the data correlator function shown in FIG. 3) are loaded for execution on a processor (such as one or more CPUs 140 as seen in FIGS. 1 and 2). The term CPU or processor includes microprocessors, microcontrollers, processor modules or subsystems (including one or more microprocessors or microcontrollers), or other control or computing devices. A "processor" can refer to a single component or to plural components.

Figure 4:
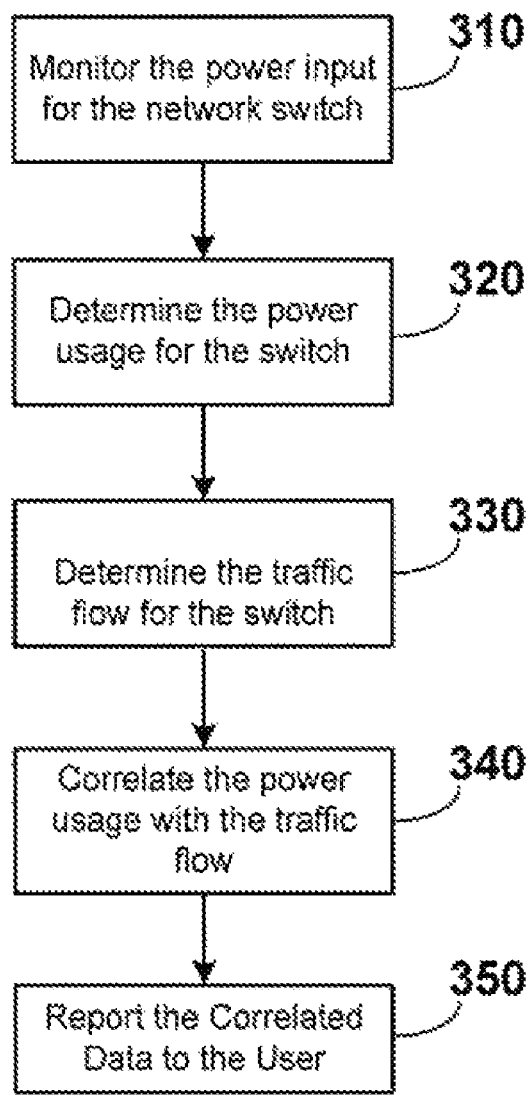
FIG. 4 is flow diagram of the method of monitoring and reporting power usage efficiency in a network switch in accordance with an embodiment of the invention.

Data and instructions (of the software for example, software for implementing the data processing steps of the method shown in FIG. 4) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In an alternative embodiment, the network switch is not a standard network switch but a Power over Ethernet (POE) Switch. For a POE switch, the network switch 100 does not include an AC input 126 or an AC to DC conversion power supply 102. Instead both power and data in are provided to the POE switch over a CAT5 cable. The power supplied over a CAT5 cable is typically around 50 volts. Thus for a POE switch, since no AC power exists, the embodiment shown in FIG. 2 is not applicable.

In one embodiment, an alternative power calculation can be made for a POE switch. POE switches often have ASICs which can report power output from the network switch. If the total output power value provided by the ASIC is subtracted from the total input power (where total input power is the DC power supplied by the CAT5 cable), then we know the total power usage by the network switch. For this case of a POE switch, we can estimate the total usage power is equal to the total input power minus the total output power.

In one embodiment, the power usage calculator 130 computes the power into the network switch in real time. In the described embodiments, data measured data is associated by the power monitor is associated a time stamp indicative of the time the data value was measured. For example, in the embodiment described with respect to FIG. 1, if a current value 106 is measured at time T1, a timestamp T1 is associated with the measured current value. In another embodiment, a timestamp is associated with the measured digital current value 125.

Referring to FIGS. 1 and 2, the network switch 100 includes a data traffic monitor 150. The data traffic monitor 150 is coupled to the data correlator 160 of the CPU 140 and the traffic ports 170a-n of the network switch. The data traffic monitor 150 may be implemented in software or hardware, but typically the data traffic monitor is implemented in hardware as an ASIC counter (not shown). Typically the ASIC counters of the data traffic monitor are cumulative counters. Each time a data packet is sent from a traffic port 170a-n of the switch, the counter of the ASIC counter is incremented.

Further, similar to the AC and DC current and voltage measurements from the power monitor that are associated with a predetermined time value, there is a predetermined time value or timestamp associated with the traffic data packets being counted by the ASIC counter of the data traffic monitor 150. The data count of the ASIC is time stamped so that the amount of data traffic over the time period between time stamps can be calculated. Thus, to determine the incremental data traffic between a time that is time stamped T1 and a time that is time stamped T2 (where T2 is greater than T1), the value of the counter at the time T1 is subtracted from it the value of the counter at time T2.

In one embodiment, the data traffic monitor 150 can report the total data traffic count across all of the ports 170a-170n. In this implementation, preferably each port 170a-170n has a separate ASIC counter to count the data packets across each individual ports 170a-170n. The output from the plurality of traffic ports 170a-170n are input into an adder circuit which adds the traffic from the plurality of traffic ports 170a-170n to determine the data traffic across all ports of the network switch 100.

Referring to FIGS. 1 and 2 show a data correlator 160 coupled to the power usage calculator 130 and to the data traffic monitor 150. The data correlator 160 takes power usage data from the power usage calculator 130 that has a timestamp T1 and associates it with or correlates it the traffic flow data from the data traffic monitor 150.

In one embodiment, the predetermined time value that is associated with the data traffic of the network device is the time interval T2–T1. For example, in one embodiment, the traffic data is associated with either predetermined time value T1 or predetermined time value T2. For example in one embodiment, the instantaneous power usage at time T1 is associated with a traffic flow over a time period T2–T1. In another alternative embodiment, the instantaneous power usage at predetermined time T2 is associated or correlated with a data traffic flow over a time period T2–T1. This correlation assumes that the power between time period T1 and T2 does not change significantly. The shorter the time period between T1 and T2, the more accurate this assumption. This assumption is made because the instantaneous traffic flow data may not be available in the network device. However, as shown in this application the traffic flow can be determined using the ASIC counters in the data traffic monitor over a predetermined time period T2–T1.

Using the time stamp, the data correlator 150 takes the instantaneous power usage data and associates it with the traffic data to form a ratio, which we call the power usage efficiency of the switch. In one embodiment, the ratio is the power usage divided by the data traffic in the switch. Alternatively, the ratio could be the data traffic divided by the power usage or some other variant. For purposes of example in the following discussions, we will proceed with defining power usage efficiency as power usage divided by traffic data.

FIG. 4 is a flowchart of the method of monitoring and reporting power usage efficiency in a network device according to one embodiment of the invention. A method for determining a correlation between power usage and traffic flow for a network device comprising the steps of: monitoring and determining the power usage for the network device 320, the power usage being associated with a predetermined time value when the power usage was monitored; determining the traffic flow of the network device 330, the traffic flow being associated with a predetermined time value when the traffic flow was measured; and correlating the power usage of the network device to the data traffic of the network device 340 by associating the predetermined time value when the power usage was monitored with the predetermined time value when the data traffic flow measurement was made.

In one embodiment, the first step of the method for correlating power usage to data traffic or the switch is to monitor the power input of the network switch 310. In FIGS. 1 and 2, this function is performed by the power monitor 120. The power monitor 120 includes an AC or DC monitoring components (122, 124) which are capable of sensing and measuring the AC and DC components of the power that is input and used in the network switch 100. The measurements are time stamped so that the time that the measurement was taken is known. The measured power values are analog values that are converted to digital values with ADC circuitry in the power monitor 120. The digital output values of the power monitor circuit 120 is input into the power usage calculator 130.

After the monitoring step 310, the power usage is calculated for the network switch (step 320). The power usage is calculated by the power usage calculator 130. Because the time period which the power data was measured is known (time stamped data), the power usage for a predetermined time value is also known.

The traffic flow for the network switch is determined in step 330. The traffic flow for the switch is determined by the data traffic monitor. Similar to the data from the power monitor circuit 120, the data traffic flow data is time stamped so that the data traffic flow for the predetermined time period (typically a time interval) is known.

After the power usage is measured the power usage and the traffic flow data are correlated (step 340). Typically, the determination of the traffic flow 330 is done simultaneously with steps of monitoring and determining the power usage 310, 320. However, the order of these steps (310,320) and step 330 may be changed. After the power usage value is determined and the traffic flow of the network device is determined, the power usage of the network device is correlated to the data traffic of the network device by associating the predetermined time value when the power usage was monitored with the predetermined time value when the data traffic flow measurement was made.

Once the data traffic data is correlated to the power data (step 350), reports can be generated to facilitate analysis of the data. Data for reports can be stored in memory, printed or displayed on a display connected to the processor. For example, although data can be analyzed for an instant in time at a predetermined timestamp, reports can be generated over longer periods. For example, data over shorter time periods might be spiky. If desirable, the user can average out the data over an increased number of time periods to get a smoother curve. For example, instead of looking at the power usage over a single time period, the user could view the data over four time periods.

Another type of report could be generated looking at instantaneous data traffic/power or instantaneous power/data. Having this data stored in memory, the user can generate various types of reports. For example, histograms could be created showing power usage/data traffic over time.

Other types of data reporting may be used also. Data can be reported of the cumulative power consumption over a period of time. For example, data might be accumulated so that power usage efficiency could be viewed for time periods of an hour over a 24 hour period.

The described method gives real time data that is correlated to the actual data traffic and network utilization. The correlated data that is reported to the user can be very useful to the network system administrator or network designer who can take the data and analyze it to take advantage of the power utilization patterns and use this data to maximize the network efficiency. Since a cost is associated with power usage, with the correlated data you can estimate how much each Gigabit of traffic on a network device is costing you in terms of power. In the embodiment shown in FIG. 1, DC power is computed by the power calculator 130. After the DC power is calculated, the power usage calculator will use the DC value to find the corresponding AC power value. Since it is AC power that is charged to the user purchasing power from a utility company, it is the AC power that is reported to the system designer.

It is anticipated that power may vary dependent upon the data traffic patterns of the network switch. Although power may have a minimum value for the network switch to remain operational, power is likely to vary as traffic of the switch varies. This data will be collected over time and the network designer can use this data to make design decisions. For example say at 7 am, data traffic on a particular network switch is heavy, but at 2 am in the morning traffic is light. Decisions may be made based on the data on the power usage efficiency data and power costs. For example a backup for this device might be performed at 2 am in the morning, if the power usage efficiency is greater and the cost is decreased. Network device utilization may be changed to another time of day because it's cheaper at this time.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A network device comprising:
   a power utilization monitor for monitoring and determining actual power usage for the network device, the actual power usage being associated with a predetermined time value when the actual power usage was monitored;
   a data traffic monitor for determining traffic flow of the network device, the traffic flow being associated with a predetermined time value when the traffic flow was measured; and
   a data correlator for correlating the actual power usage of the network device to the data traffic of the network device by associating the predetermined time value when the actual power usage was monitored with the predetermined time value when the data traffic flow measurement was made.

2. The network device recited in claim 1, further including a power monitoring device for monitoring a current value and a voltage value of the network switch, wherein the current value and the voltage value are associated with a predetermined time when the current value and the voltage value are monitored.

3. The network device recited in claim 2, wherein the power monitoring device is a DC power monitor that is electrically coupled to an AC to DC conversion power supply.

4. The network device recited in claim 3, wherein the network device is a POE switch.

5. The network device recited in claim 1, wherein the data traffic monitor includes an ASIC counter which increments as data traffic flows over the switch, wherein the predetermined time value is a time interval T2–T1 and the data traffic is measured by subtracting the value of the counter at the end of the time interval T2 from the data traffic measured at the beginning of the time interval T1.

6. The network device recited in claim 1, wherein the data correlator computes a power usage efficiency by dividing the actual power usage at the predetermined time value when the actual power usage was monitored by an associated traffic flow value at the predetermined time value when the traffic flow was measured.

7. A method for determining a correlation between actual power usage and traffic flow for a network device comprising the steps of:
   monitoring and determining the actual power usage for the network device, the actual power usage being associated with a predetermined time value when the actual power usage was monitored;
   determining the traffic flow of the network device, the traffic flow being associated with a predetermined time value when the traffic flow was measured; and
   correlating the actual power usage of the network device to the data traffic of the network device by associating the predetermined time value when the actual power usage was monitored with the predetermined time value when the data traffic flow measurement was made.

8. The method recited in claim 7, further comprising the step of monitoring a current value and a voltage value of the network switch, wherein the monitored current value and the monitored voltage value are associated with the predetermined time when the current value and the voltage value are monitored, wherein the monitoring of the current value and the voltage value is performed by a power monitoring device.

9. The method recited in claim 7, further comprising the step of wherein incrementing a counter as traffic flows over the network device, wherein the traffic flow is measured by subtracting the value of the counter at the end of the time interval T2 from the data traffic measured at the beginning of the time interval T1, wherein the predetermined time value is a time interval T2–T1.

10. The method recited in claim 7, further comprising the step of computing a power usage efficiency by dividing the actual power usage at the predetermined time value when the actual power usage was monitored by associated traffic flow value at the predetermined when the traffic flow was measured, wherein the computing step is performed by the data correlator.

11. The method recited in claim 7, wherein the power monitoring device is a DC power monitoring device, further comprising the step of converting the DC power usage to an AC power usage value using an efficiency curve stored in a memory accessible by a CPU.

12. The method recited in claim 7, further including the step of reporting the correlated actual power usage and data traffic data.

13. A non-transitory computer readable storage medium encoded with code representing computer executable instructions and computer readable data, said code when executed for:
- monitoring and determining actual power usage for a network device, the actual power usage being associated with a predetermined time value when the actual power usage was monitored;
- determining traffic flow of the network device, the traffic flow being associated with a predetermined time value when the traffic flow was measured; and
- correlating the actual power usage of the network device to the data traffic of the network device by associating the predetermined time value when the actual power usage was monitored with the predetermined time value when the data traffic flow measurement was made.

14. The non-transitory computer readable storage medium recited in claim 13, further comprising monitoring a current value and a voltage value of the network switch, wherein the monitored current value and the monitored voltage value are associated with the predetermined time when the current value and the voltage value are monitored, wherein the monitoring of the current value and the voltage value is performed by a power monitoring device.

15. The non-transitory computer readable storage medium recited in claim 13, further comprising incrementing a counter as traffic flows over the network device, wherein the traffic flow is measured by subtracting the value of the counter at the end of the time interval T2 from the data traffic measured at the beginning of the time interval T1.

16. The non-transitory computer readable storage medium recited in claim 13, further comprising computing a power usage efficiency by dividing the actual power usage at the predetermined time value when the actual power usage was monitored by associated traffic flow value at the predetermined when the traffic flow was measured, wherein the computing step is performed by the data correlator.

17. The non-transitory computer readable storage medium recited in claim 13, further comprising converting the DC power usage to an AC power usage value using an efficiency curve stored in a memory accessible by a CPU, wherein the power monitoring device is a DC power monitoring device.

18. The non-transitory computer readable storage medium recited in claim 13, further comprising reporting the correlated actual power usage and data traffic data.

* * * * *